(12) United States Patent
Tsujii

(10) Patent No.: US 8,355,617 B2
(45) Date of Patent: Jan. 15, 2013

(54) RECORDING APPARATUS

(75) Inventor: Hideaki Tsujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2060 days.

(21) Appl. No.: 10/998,727

(22) Filed: Nov. 30, 2004

(65) Prior Publication Data
US 2005/0141880 A1    Jun. 30, 2005

(30) Foreign Application Priority Data

Dec. 26, 2003 (JP) .................. 2003-435126
Feb. 27, 2004 (JP) .................. 2004-053293

(51) Int. Cl.
*H04N 9/80* (2006.01)
(52) U.S. Cl. ...................................... 386/239
(58) Field of Classification Search .............. 386/46
See application file for complete search history.

(56) References Cited

U.S. PATENT DOCUMENTS

| 5,731,923 A | 3/1998 | Sakuma ................ 360/69 |
| 5,806,072 A | 9/1998 | Kuba et al. ............. 707/200 |
| 6,272,088 B1* | 8/2001 | Aramaki et al. ......... 369/53.24 |
| 2003/0223140 A1* | 12/2003 | Kobata et al. .............. 360/15 |

FOREIGN PATENT DOCUMENTS

| CN | 1163451 A | 10/1997 |
| CN | 1237764 A | 12/1999 |
| JP | 6-153140 A | 5/1994 |
| JP | 10-21675 | 1/1998 |
| JP | 10-112165 | 4/1998 |

* cited by examiner

*Primary Examiner* — William C Vaughn, Jr.
*Assistant Examiner* — Daniel Tekle
(74) *Attorney, Agent, or Firm* — Fitzpatrick, Cella, Harper & Scinto

(57) ABSTRACT

A recording apparatus includes: a recording unit that records information data on a mounted recording medium; a detecting unit that detects first identification information for identifying a mounted first recording medium; and a generating unit that generates second identification information related to the first identification information detected by the detecting unit when a second recording medium is mounted instead of the first recording medium. The recording unit records the second identification information generated by the generating unit on the second recording medium.

27 Claims, 18 Drawing Sheets

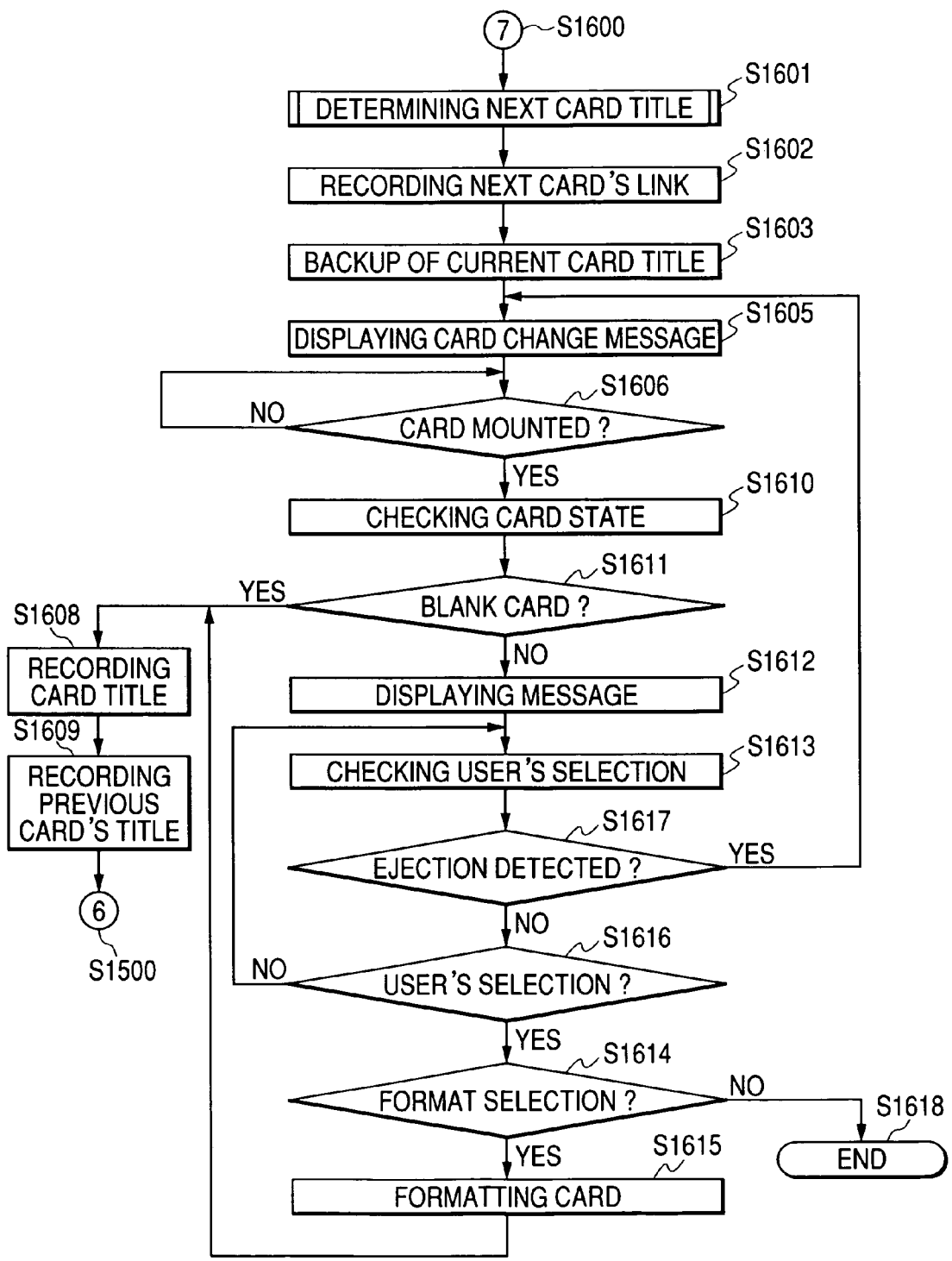

RECORDING APPARATUS

BACKGROUND OF THE INVENTION

1. Field of the Invention

The present invention relates to a recording apparatus, and in particular, to an apparatus for recording information data such as images and sounds on plural recording mediums.

2. Related Background Art

Conventionally, apparatuses for recording images and sounds as digital data such as a digital video camera and a digital still camera have been known. Digital image data and sound data have an extremely large amount of information. In a digital camera of recent years, the number of photographing pixels increases rapidly and an amount of recorded data tends to increase. In addition, in the field of a video camera, an amount of recorded data also tends to increase because a recording format shifts from an SD format to an HD format.

As described above, in accordance with the increase in an amount of recorded data, a storage capacity of a recording medium also increases. However, since a single recording medium has limited storage capacity, a user is often urged to change a recording medium in order to continue recording.

Therefore, the user has to own a large number of recording mediums having similar appearances. Under such circumstances, it is an effective way to attach titles to recording mediums so that the user can confirm recorded contents. This is because, if titles are attached, the user can identify the recording mediums with small amount of information without reproducing all the recorded contents.

However, as a result of reduction in weight, size, price, and the like in apparatuses such as a digital video camera and a digital still camera, a sufficient input environment for work of attaching titles to recording mediums is not provided in the apparatuses in many cases. Therefore, there is a demand for means for simplifying an input portion as much as possible and automatically generating unique titles.

Under such circumstances, as a method of automatically generating a title for a medium, there is a method of adopting "date+time" as a title in CR-R/RW writing software used in a personal computer. In addition, Japanese Patent Application Laid-Open No. H06-153140 discloses a method of preventing overlap of file names and automatically generating a unique title in an apparatus in which an input environment for titles is not sufficient.

However, since a title of the prior art, which is automatically generated as described above, is only "date+time," it is difficult for a user to identify recorded contents. In addition, when the user designates a part of a title, there is a problem in that operation is complicated because the user has to edit the title on a dedicated menu screen. Further, when plural users use an apparatus, there is a problem in that the users have trouble in operation because each user has to make own setting for generating a title.

SUMMARY OF THE INVENTION

It is an object of the present invention to solve the problems described above.

It is another object of the present invention to make it possible to provide a recording apparatus that is capable of easily determining and recording identification information of a recording medium.

It is still another object of the present invention to make it possible to, even in the case where plural users use an apparatus, simplify operation for creating identification information and reduce a burden on the users.

In order to solve the above problems and achieve the above objects, according to one aspect of the present invention, a recording apparatus of the present invention, including:

recording means for recording information data on a mounted recording medium;

detecting means for detecting first identification information for identifying a mounted first recording medium; and generating means for generating second identification information related to the first identification information detected by the detecting means, when a second recording medium is mounted instead of the first recording medium, wherein the recording means records the second identification information generated by the generating means on the second recording medium.

Objects of the present invention other than those described above and characteristics of the present invention will be apparent from the following detailed explanation of embodiments of the present invention that is made with reference to the drawings.

BRIEF DESCRIPTION OF THE DRAWINGS

FIG. 16 is a flowchart showing an operation at the time of continuation of recording in the third embodiment;

DESCRIPTION OF THE PREFERRED EMBODIMENTS

Exemplary embodiments of a recording apparatus, a recording method, a computer program, and a computer readable recording medium of the present invention will be hereinafter explained with reference to the accompanying drawings.

Figure 1:
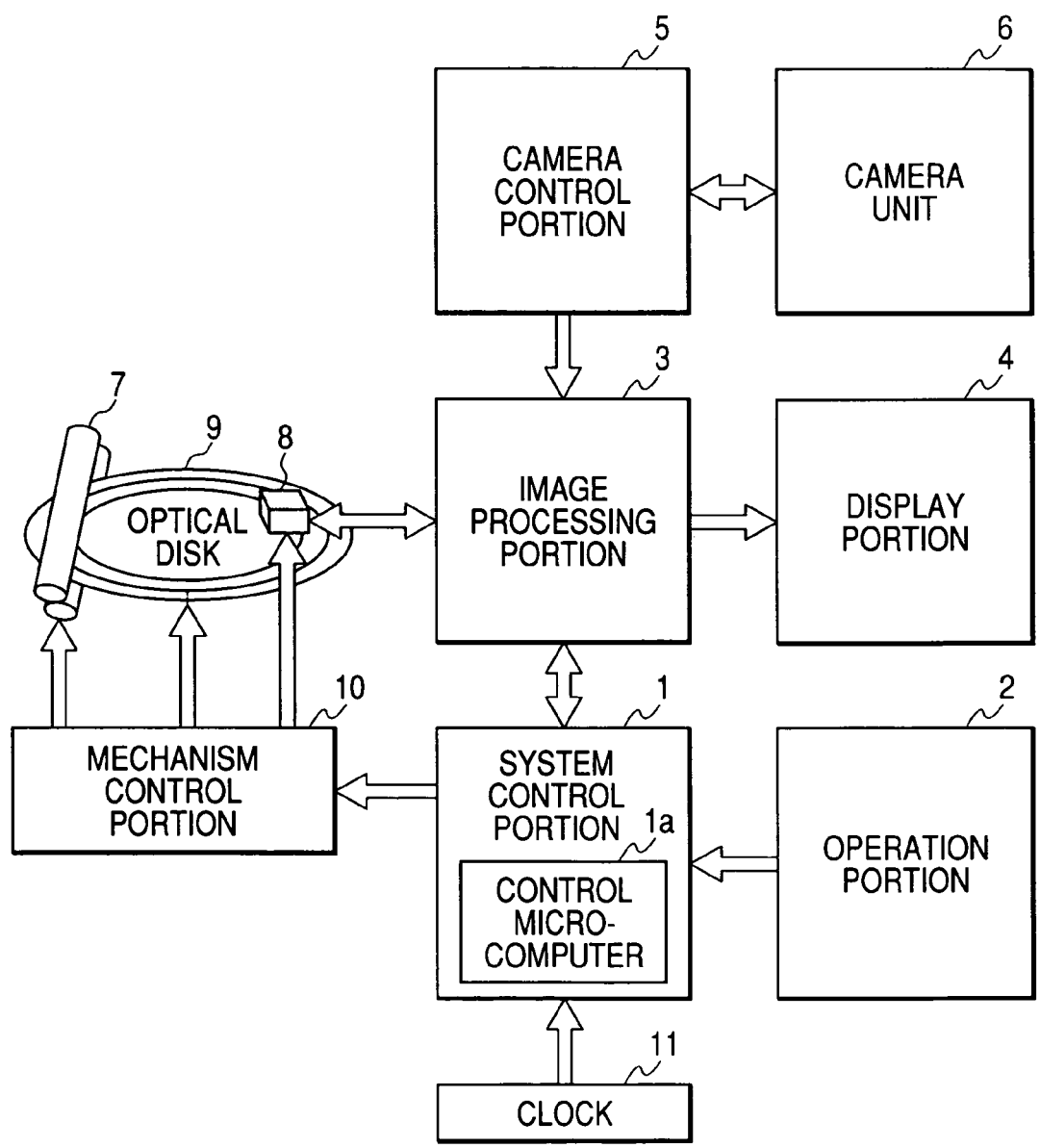
FIG. 1 is a block diagram showing a structure of a video camera as an embodiment of the present invention.

FIG. 1 shows an example of application of the present invention, where the invention is applied to a digital video camera having an optical disk as a recording medium.

A camera control portion 5 includes a circuit group for performing drive control such as focus control, zoom control, and iris control for a camera unit 6, and control for a photographing element. At the time of photographing, image data converted into a digital signal is sent to an image processing portion 3.

The image processing portion 3 encodes the image data outputted from the camera control portion 5, in accordance with a well-known encoding system such as MPEG to compress an amount of information of the image data and record and store the image data in an optical disk 9 serving as a recording medium using a pickup 8. In addition, at the time of reproduction, the image processing portion 3 decodes image data read out from the optical disk 9 by means of the pickup 8 to expand an amount of information of the image data and then display an image on a display portion 4.

The optical disk 9 is controlled by a mechanism control portion 10. The mechanism control portion 10 controls the pickup 8 for writing and reading data, a not-shown spindle motor, a loading roller 7 for optical disk loading, and the like. Note that, in this embodiment, since a system control portion 1 controls loading of the optical disk 9, a structure of a slot-in system, which prevents a user from taking out the optical disk 9 carelessly, is adopted.

The system control portion 1 includes a control microcomputer 1a, a not-shown ROM for storing programs, and a not-shown RAM serving as a main storage. The RAM has a work area for temporarily backing up information of the optical disk 9 and the like. With an operation portion 2, a user can instructs the system control portion 1 to perform various functions. In addition to a photographed image and a reproduced image, the system control portion 1 displays information indicating a state of the apparatus on the display portion 4 via the image processing portion 3. A clock 11 generates information on year, month, and time.

Figure 7:
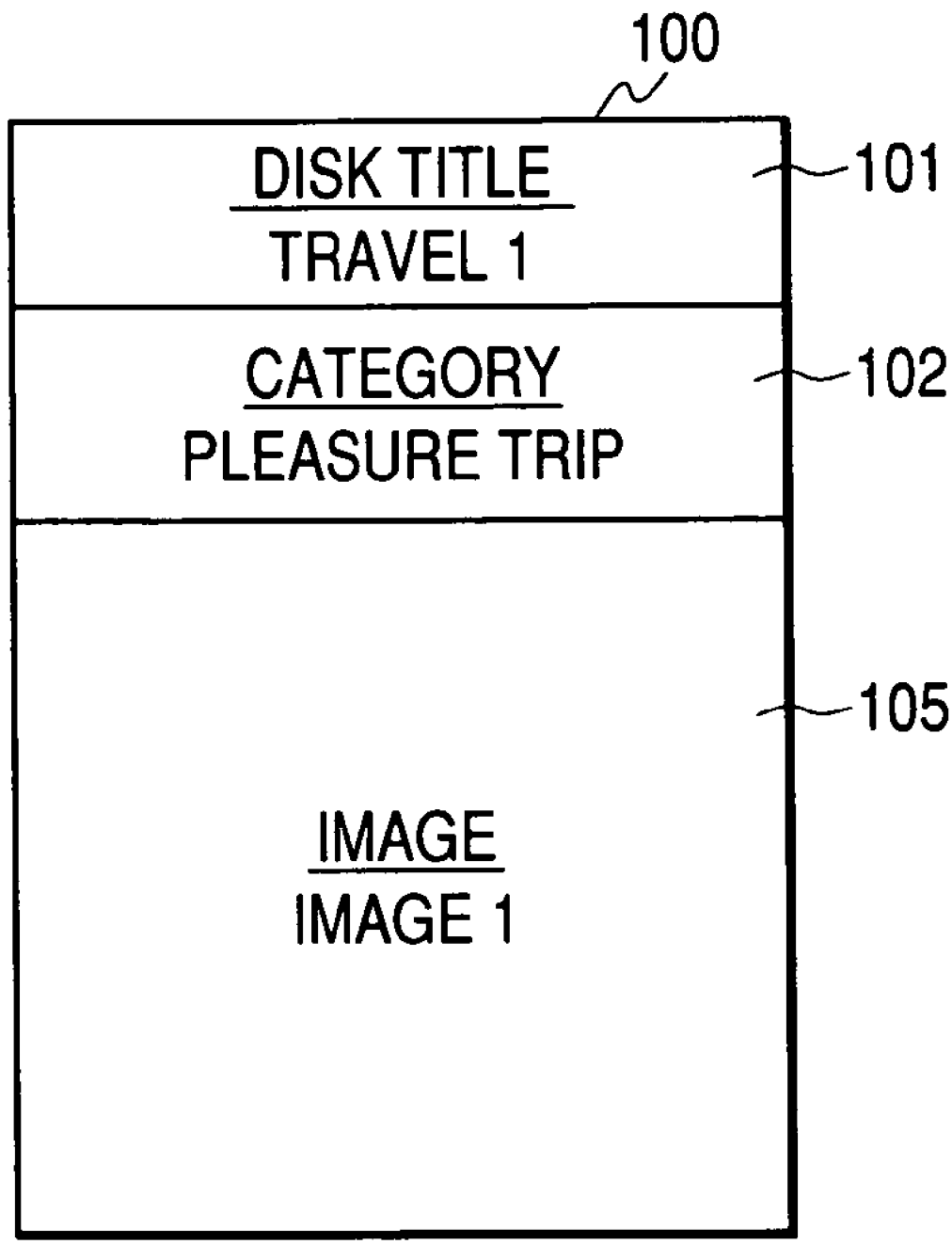
FIG. 7 is a diagram showing a format of data to be recorded in a disk.

FIG. 7 shows an example of a recording format of a disk 100 of this embodiment. Since it is necessary to read out a "disk title 101," which is identification information of a medium, immediately after the disk 100 is loaded, it is desirable that the disk title 101 should be recorded in an area accessible at high speed, such as an outer periphery of the disk 100 where disk management information or the like is recorded. Other than the disk title 101, the area of the disk 100 is classified into an area where additional information such as a category is recorded and an area where data such as an image is recorded.

FIGS. 2 to 6 are flowcharts showing operations of the control microcomputer 1a of this embodiment. An operation at the time of recording in this embodiment will be hereinafter explained with reference to those flowcharts.

Figure 2:
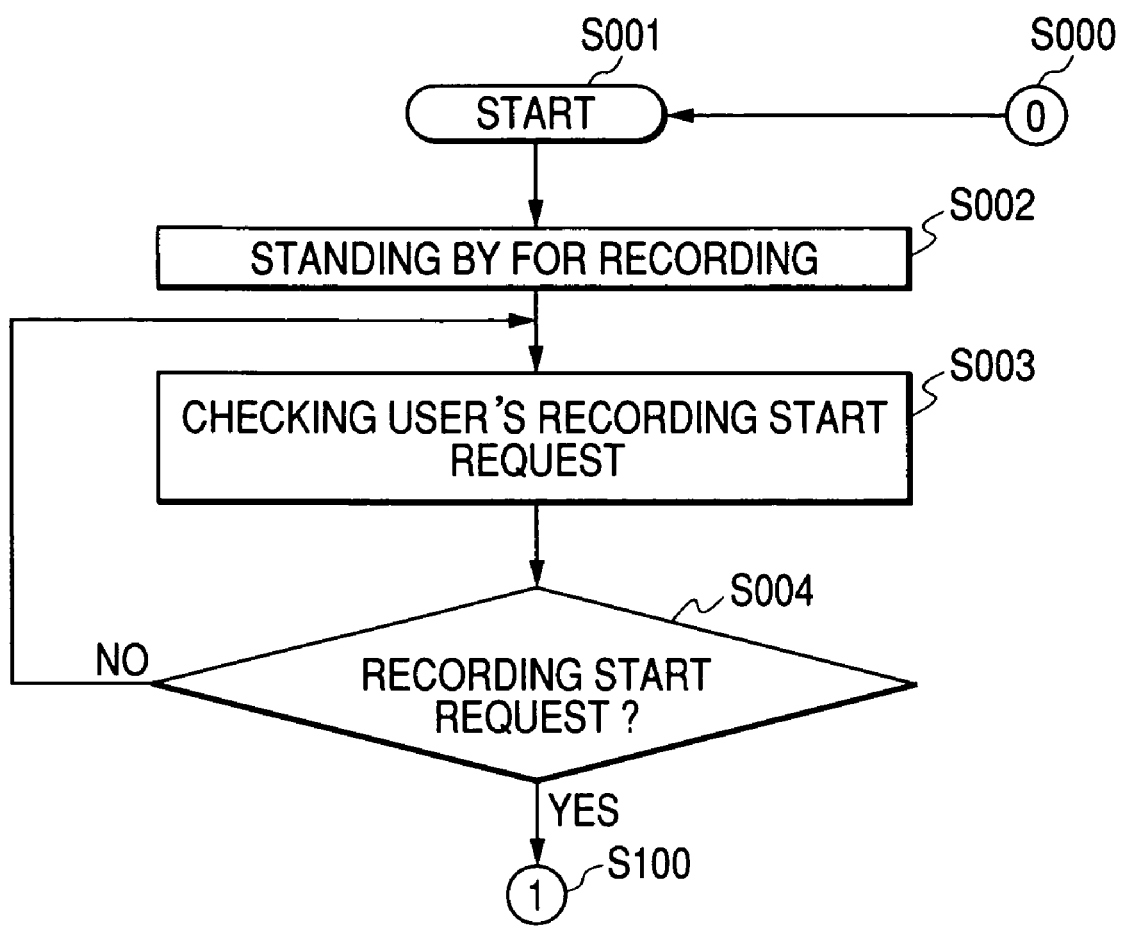
FIG. 2 is a flowchart showing an operation at the time of standby for recording.

In the flowchart of FIG. 2, when a user operates a mode switch of the operation portion 2 to switch a mode to a photographing mode in order to perform photographing, the control microcomputer 1a starts processing (step S001), shifts to a recording standby state (step S002), and comes into a state for waiting for a recording start request from the user (steps S003 and S004).

Figure 3:
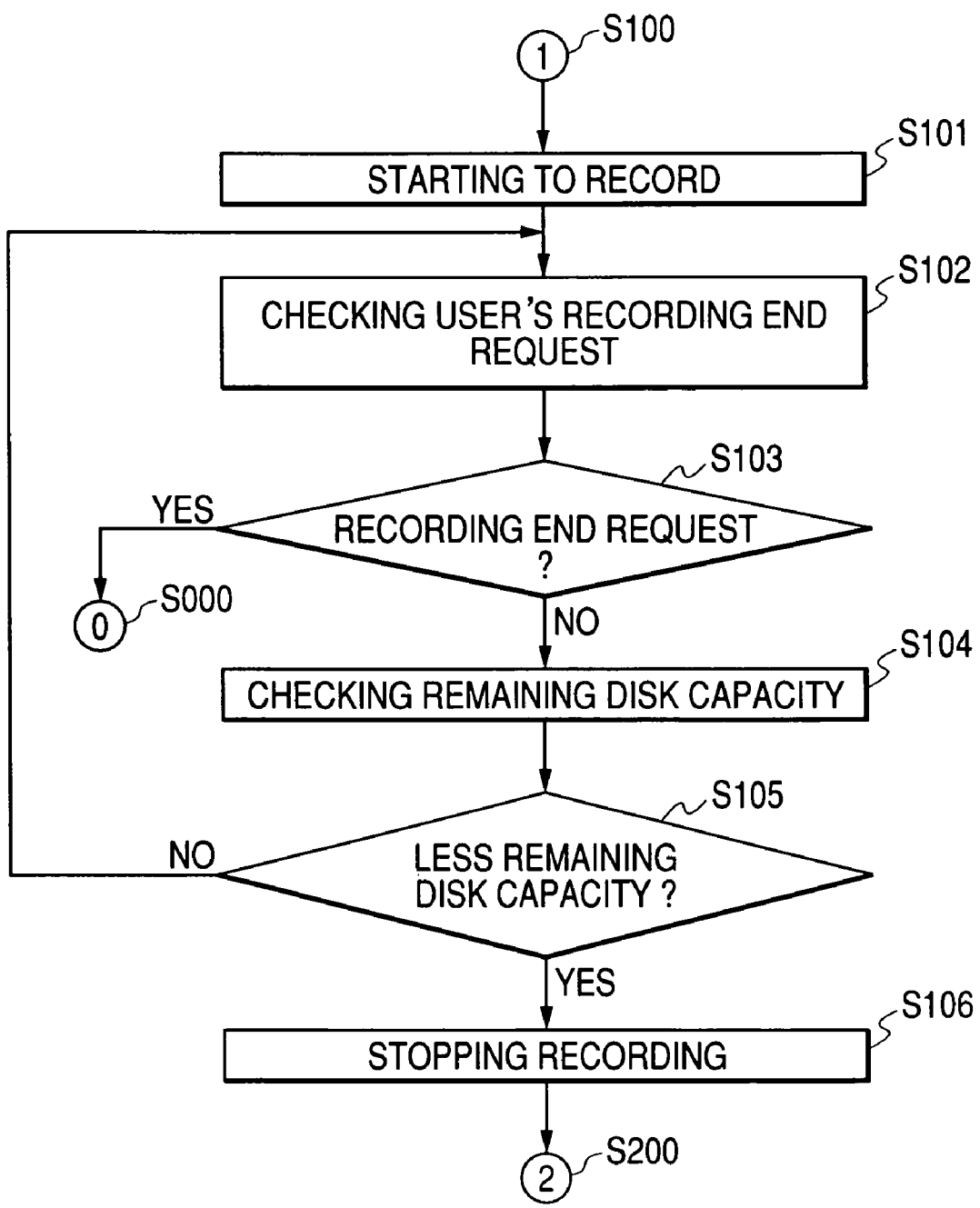
FIG. 3 is a flowchart showing an operation during recording.

Then, when the user depresses a recording trigger of the operation portion 2, the control microcomputer 1a judges that a recording start request from the user is received and shifts to step S100 in FIG. 3.

FIG. 3 shows a flowchart of the control microcomputer 1a during recording.

When the recording starts (step S101), the control microcomputer 1a checks a recording end request from the user (step S102). If there is no recording end request from the user (step S103), the control microcomputer 1a checks a remaining disk capacity (step S104). Then, the control microcomputer 1a judges whether the remaining disk capacity is less than a predetermined amount (step S105). If the remaining disk capacity is less than the predetermined amount, the control microcomputer 1a stops the recording (step S106). If the remaining disk capacity is more than the predetermined amount, the control microcomputer 1a returns to step S102 and continues the recording.

In addition, when the user depresses the recording trigger of the operation portion 2 again in S103, the control microcomputer 1a detects this operation and shifts to the recording standby state again (step S000).

Figure 4:
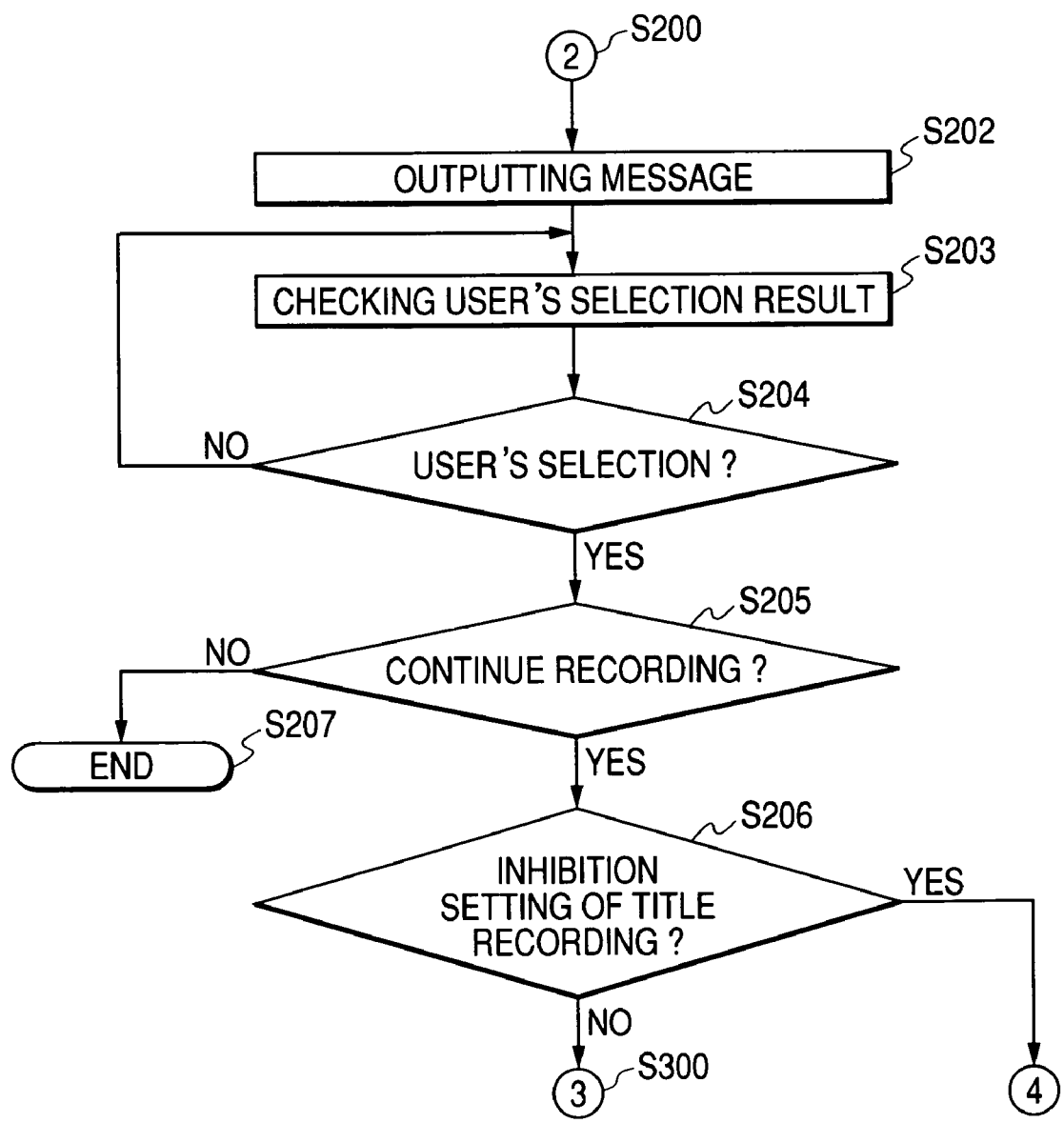
FIG. 4 is a flowchart showing an operation at the time of continuation of recording.

FIG. 4 shows a flowchart explaining an operation of the control microcomputer 1a concerning recording continuation selection processing. When a remaining capacity of an image recording area of a disk runs out, the control microcomputer 1a displays a message shown in 200 of FIG. 8 on the display portion 4 (step S202).

Next, the control microcomputer 1a waits until the user selects "continue recording (202)" or "end recording (203)" using the operation portion 2.

The control microcomputer 1a is in an input waiting state (steps S203 and S204) until selection by the user is performed. When the user selects "continue recording (202)," the control microcomputer 1a discriminates a state of inhibition setting of title recording. If title recording is not inhibited, the control microcomputer 1a shifts to title formation start processing (step S300). If the title recording is inhibited, the control microcomputer 1a shifts to step S304 in FIG. 5.

If the user selects "end recording (203)" in step S205, the control microcomputer 1a ends the recording (step S207).

Next, disk title determination processing in S301 in FIG. 5 will be explained with reference to a flowchart of FIG. 6. FIG. 6 shows a flowchart explaining an example of an operation of the control microcomputer 1a at the time of disk title formation.

When title formation is started in step S310, first, the control microcomputer 1a divides a title character string of a disk, which is currently inserted, and performs syntax analysis (step S411). Then, the control microcomputer 1a judges whether a suffix of a current disk title is a numerical value (step S412). If the judgment result shows that the suffix of the current disk title is a numerical value, the control microcomputer 1a updates the suffix with a numerical value obtained by adding "1" to the suffix and stores the disk title in the memory as a title candidate of the next disk (step S413). On the other hand, if the suffix is not a numerical value, the control microcomputer 1a adopts a disk title obtained by adding "1" to the end of the current disk title, as a disk title of the next disk (step S414).

Next, in step S415, the control microcomputer 1a displays the title candidates of the next disk formed in steps S414 and S415.

Next, in step S421, the control microcomputer 1a checks inhibition setting of title editing. If the title editing is not inhibited, the control microcomputer 1a displays a message 205 shown in 204 in FIG. 8 on the display portion 4, displays the candidates in 206, and presents the user with selection means together with "title editing (208)" and "OK button (207)" functions.

The control microcomputer 1*a* is in an input waiting state (steps S416 and S417) until the user determines a title. When the user selects a title, the control microcomputer 1*a* proceeds to step S418 and judges whether the title candidate of the next disk is adopted. If title editing is selected as a result of the judgment, the control microcomputer 1*a* edits a title (step S419). If the candidate is adopted, the control microcomputer 1*a* determines the title of the candidate as a disk title of the next disk and ends the disk title formation processing (step S420).

Figure 9:
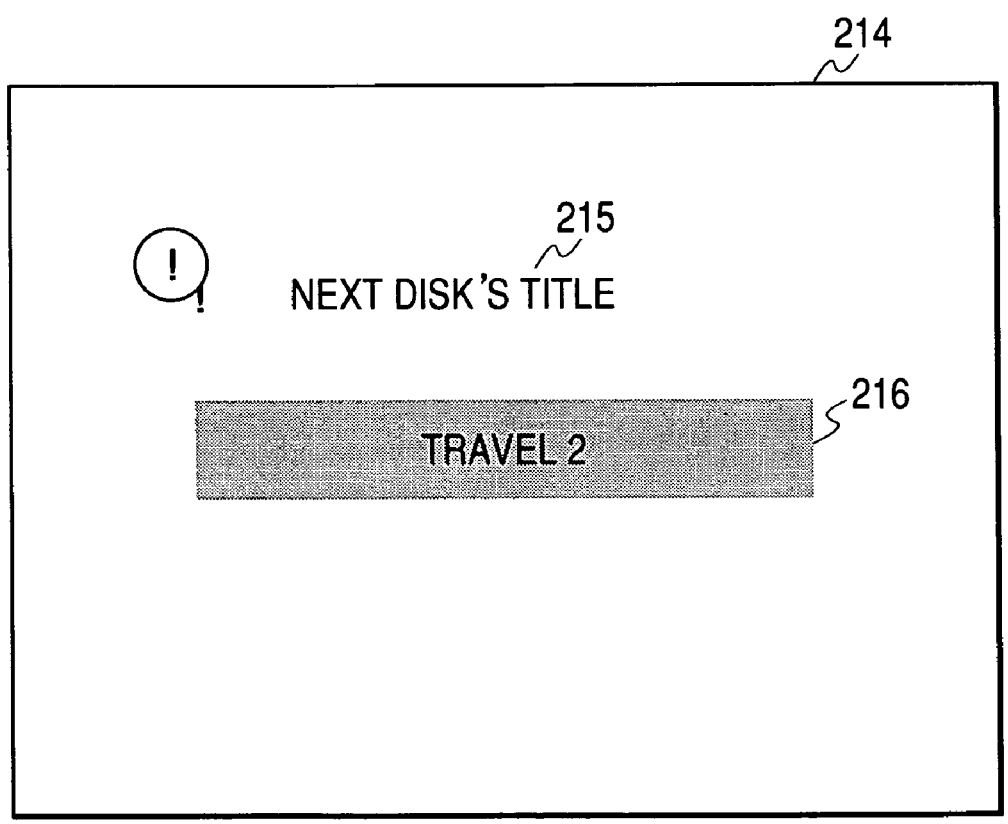
FIG. 9 is a diagram showing an example of a message to be displayed at the time of photographing.

On the other hand, if it is judged in step S421 that title editing is inhibited, the control microcomputer 1*a* proceeds to steps S422 and S423, displays a message 215 shown in 214 in FIG. 9 on the display portion 4, displays an automatically generated title in 216, and ends the disk title formation processing.

Here, concerning the method of forming a candidate of the next disk title, for example, if date and time information is included in a part of a title, it is possible to form a unique title more easily. In this embodiment, since a suffix is incremented to form a candidate of the next disk title, if information including date and time is added as a suffix, it is possible to design a disk title more easily.

Figure 5:
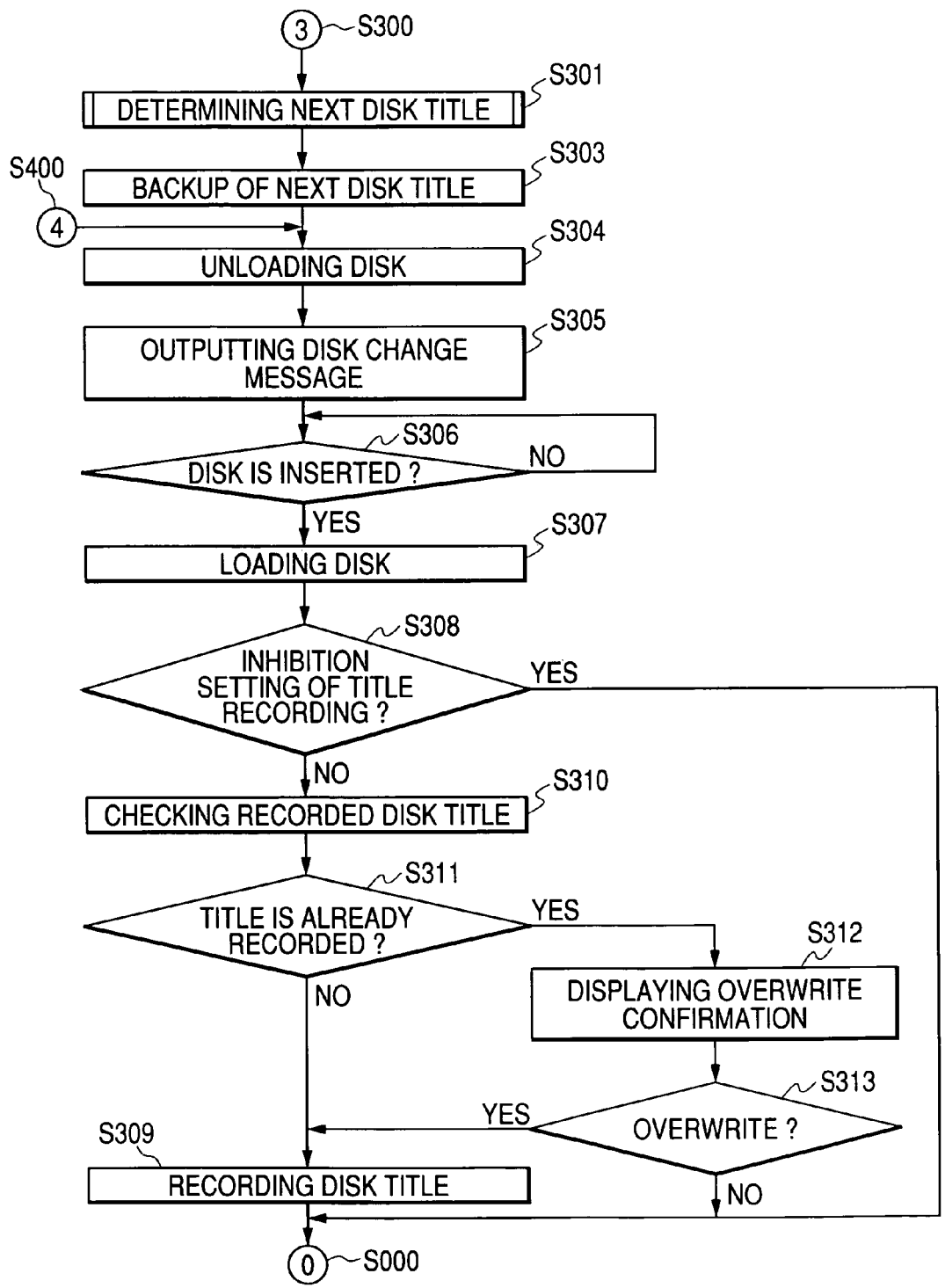
FIG. 5 is a flowchart showing an operation at the time of disk change.
Figure 6:
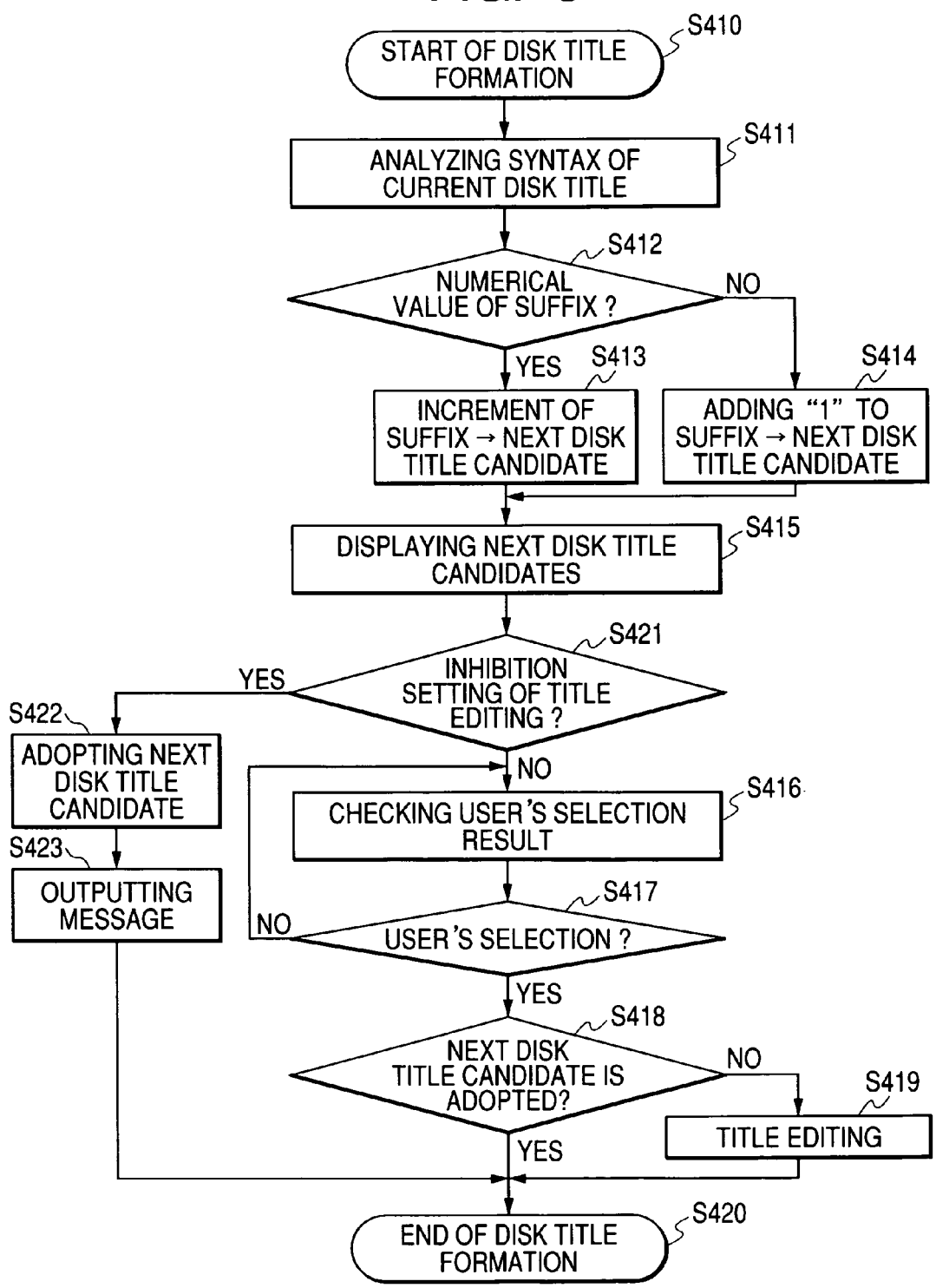
FIG. 6 is a flowchart showing title formation processing for the next disk.

When the disk title is determined in this way, the control microcomputer 1*a* returns to the flow of FIG. 5 and backs up the disk title in the RAM in the control portion (step S303). Then, when the backup of the disk title ends, the control microcomputer 1*a* unloads the optical disk 9 with the loading roller 7 (step S304) and displays a message 210 shown in 209 in FIG. 8 on the display portion 4 together with a cancel button 211 (step S305).

Here, the control microcomputer 1*a* waits for input until the user inserts the next optical disk 9 (step S306). When the user inserts the new optical disk 9 in a loading portion, the control microcomputer 1*a* detects the insertion of the optical disk 9 using a method such as a method of detecting rotation of the loading roller 7 or a method in which a not-shown sensor detects the insertion of the optical disk 9. Then, when the insertion of the optical disk 9 is detected, the control microcomputer 1*a* loads the new optical disk 9 (step S307).

When the loading of the optical disk 9 is completed, the control microcomputer 1*a* checks inhibition setting of title recording (step S308). If title recording is not inhibited, the control microcomputer 1*a* checks whether a title of the optical disk 9 has already been recorded (step S310).

If a result of the check in step S310 shows that a title of the optical disk 9 is not recorded, the control microcomputer 1*a* records the title of the optical disk 9 determined in step S301 in a predetermined area of the new optical disk 9 (step S309). Then, the control microcomputer 1*a* shifts to the recording standby state (the state of FIG. 2) again.

On the other hand, if title recording is inhibited in the judgment in step S308, the control microcomputer 1*a* shifts to the recording standby state (FIG. 2) again without recording the disk title in the new optical disk 9.

Figure 8:
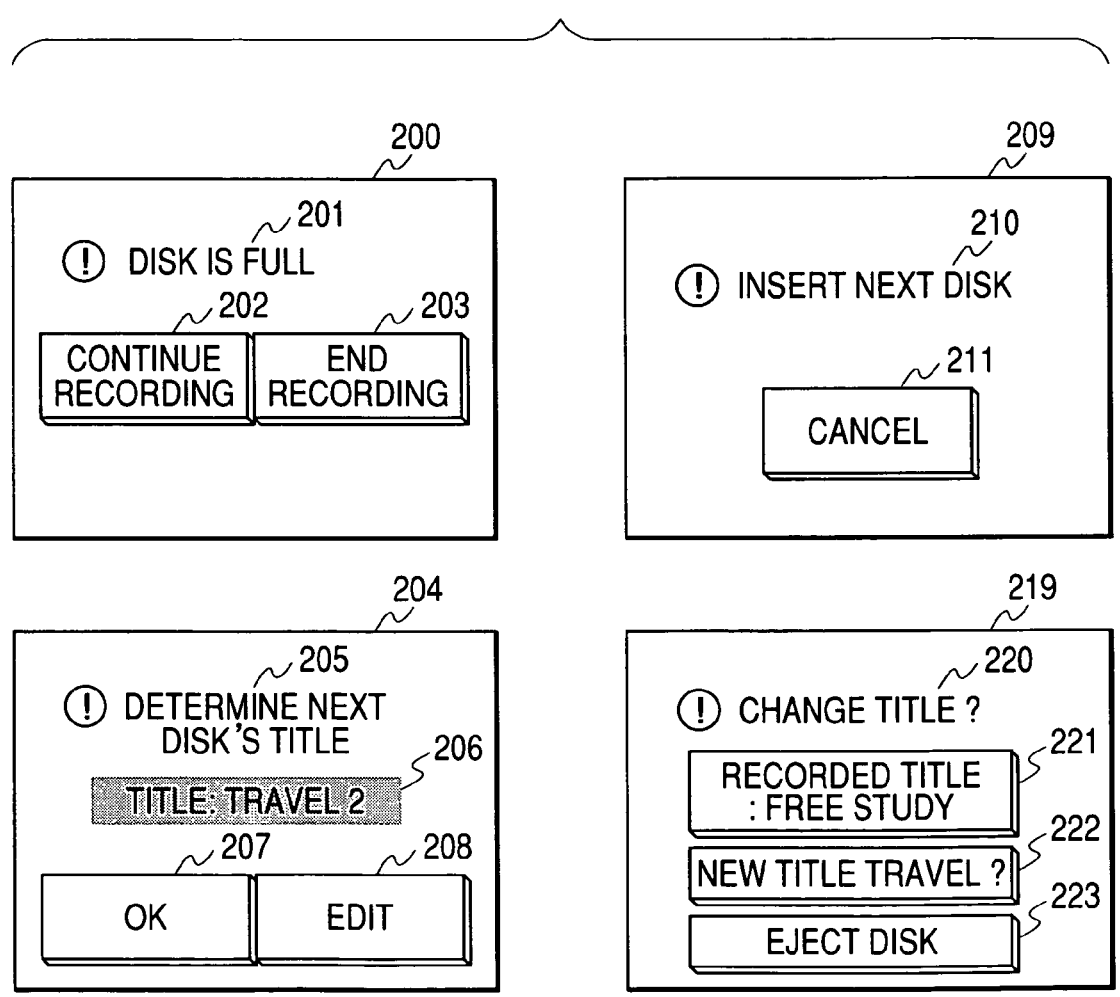
FIG. 8 is a diagram showing an example of a message to be displayed at the time of photographing.

If a title has already been recorded in the inserted optical disk 9 in step S310, the control microcomputer 1*a* displays a message denoted by reference numeral 219 in FIG. 8 on the display portion 4 (step S312) and asks the user if the title may be overwritten (step S313).

For example, when the user selects 222 in FIG. 8, the control microcomputer 1*a* judges that the title may be overwritten and records the disk title determined in step S301 in a predetermined area of the new optical disk 9 (step S309).

Although not explained in the flowcharts, when the optical disk 9 is changed, it is also possible to copy information such as a "category 102" and an "image 105" shown in FIG. 7 to categories of the next optical disk 9. In addition, other than the "category 102," by arranging an area for recording setting information of an apparatus for each user a disk, it is also possible to copy setting information of an apparatus in the next optical disk 9 to the area.

In this way, according to this embodiment, when a disk is changed to continue photographing, a title of a disk after change is automatically determined in a form continuous with a title of the disk before change based on the title of the disk before change, and the title is recorded in the disk after change. Consequently, the user can add a title, which allows the user to easily identify the disk before change and the disk after change, to the disk after change without editing a title.

Next, a second embodiment of the present invention will be explained.

In this embodiment, a structure of a video camera is the same as that shown in FIG. 1 but processing shown in the flows of FIGS. 4 and 5 is different from that in the first embodiment.

In addition, in this embodiment, information in a disk after change, which was recorded after the change, is referred to as a "link destination" and information in a disk before change is referred to as a "link source."

Figure 10:
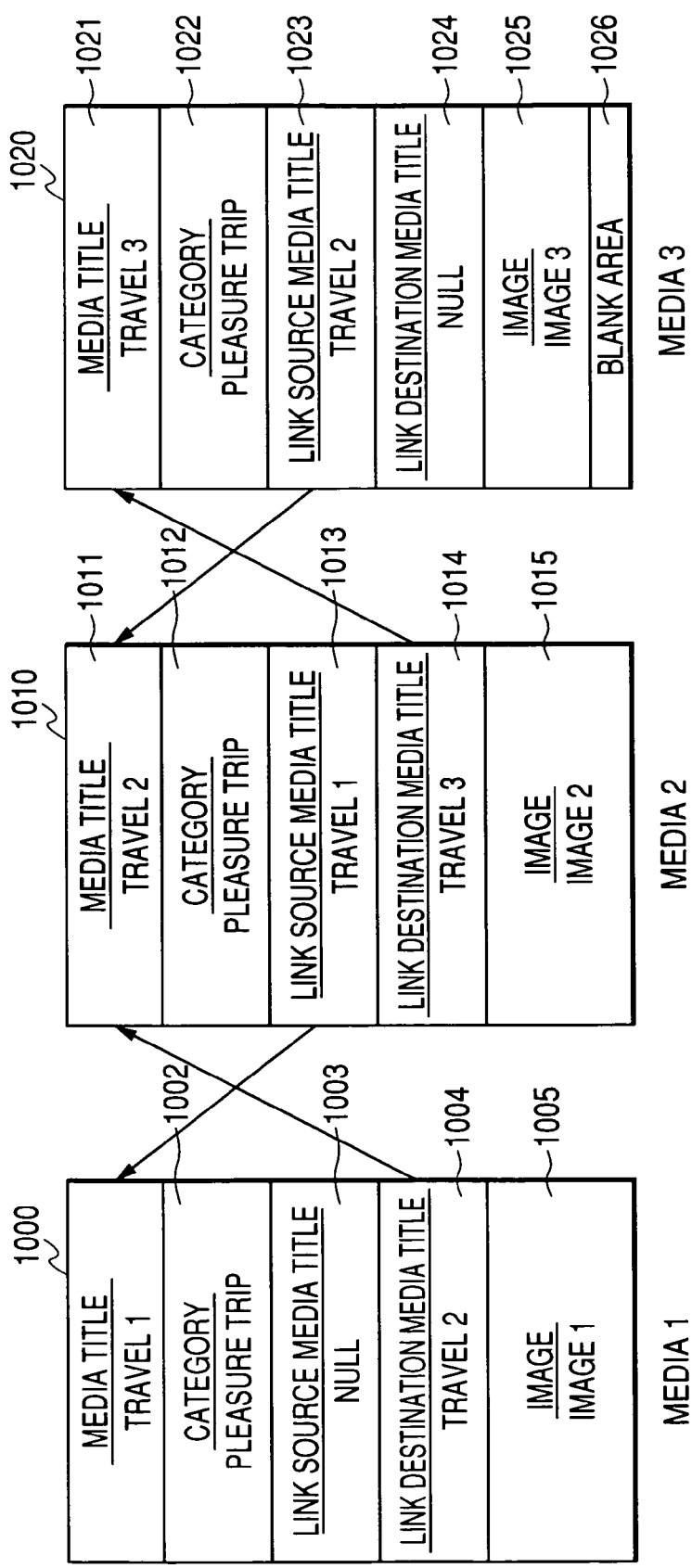
FIG. 10 is a diagram showing a state of data to be recorded in a disk.

Here, FIG. 10 shows a state of data to be recorded in a disk in this embodiment.

In FIG. 10, it is assumed that a disk, which is currently mounted, is denoted by 1010 (a disk 2) in the figure. A title 1011 of 1010 is "travel 2." In addition, "leisure trip" is recorded in a category 1012, and "travel 1" is recorded as a link source disk title 1013 of the disk 1010 that is the same data as a title 1001 that is information in a disk 1000 (mediums 1) which records data before change of the disk 1010.

Note that, in FIG. 10, reference numerals 1003, 1013, and 1023 denote "link source disk titles;" 1005, 1015, and 1025, image data; and 1026, a blank area.

In addition, when it is assumed that a disk recording image data continuous from the disk 1010 is denoted by 1020, the same information as the title 1021 of the disk 1020, which serves as link destination data, is recorded in the link destination disk title 1014 of the disk 1010 as "travel 3."

Next, a characteristic operation of this embodiment will be explained.

Figure 11:
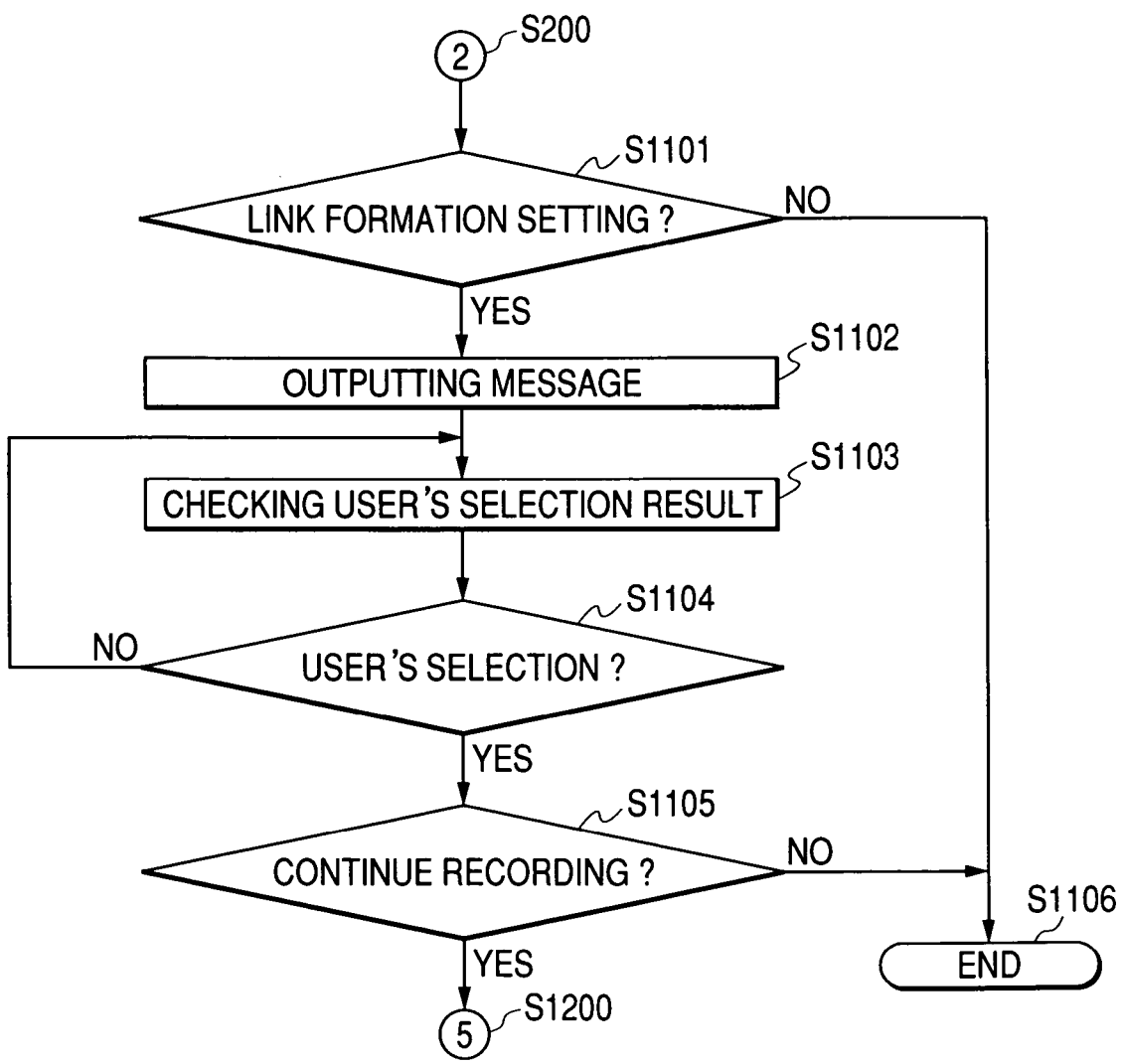
FIG. 11 is a flowchart showing an operation at the time of continuation of recording.

FIG. 11 is a flowchart showing processing concerning the recording continuation selection processing executed by the control microcomputer 1*a* following S200 in FIG. 3 in the first embodiment.

When a remaining capacity of an image recording area of a disk runs out during recording and link formation setting (step S1101) is effective, the control microcomputer 1*a* displays a message screen 200 shown in FIG. 8 on the display portion 4 (step S1102).

The control microcomputer 1*a* is in an input waiting state (steps S1103 and S1104) until the user selects "continue recording (202)" or "end recording (203)" according to the display described above. Then, if the user selects "continue recording (202)" in step S1105, the control microcomputer 1*a* shifts to link formation processing (step S1200) in FIG. 12.

If the user selects "end recording (203)" in step S1105, the control microcomputer 1*a* proceeds to step S1106 and ends the recording. If link formation is ineffective in step S1101, the control microcomputer 1*a* ends the recording in the same manner.

Figure 12:
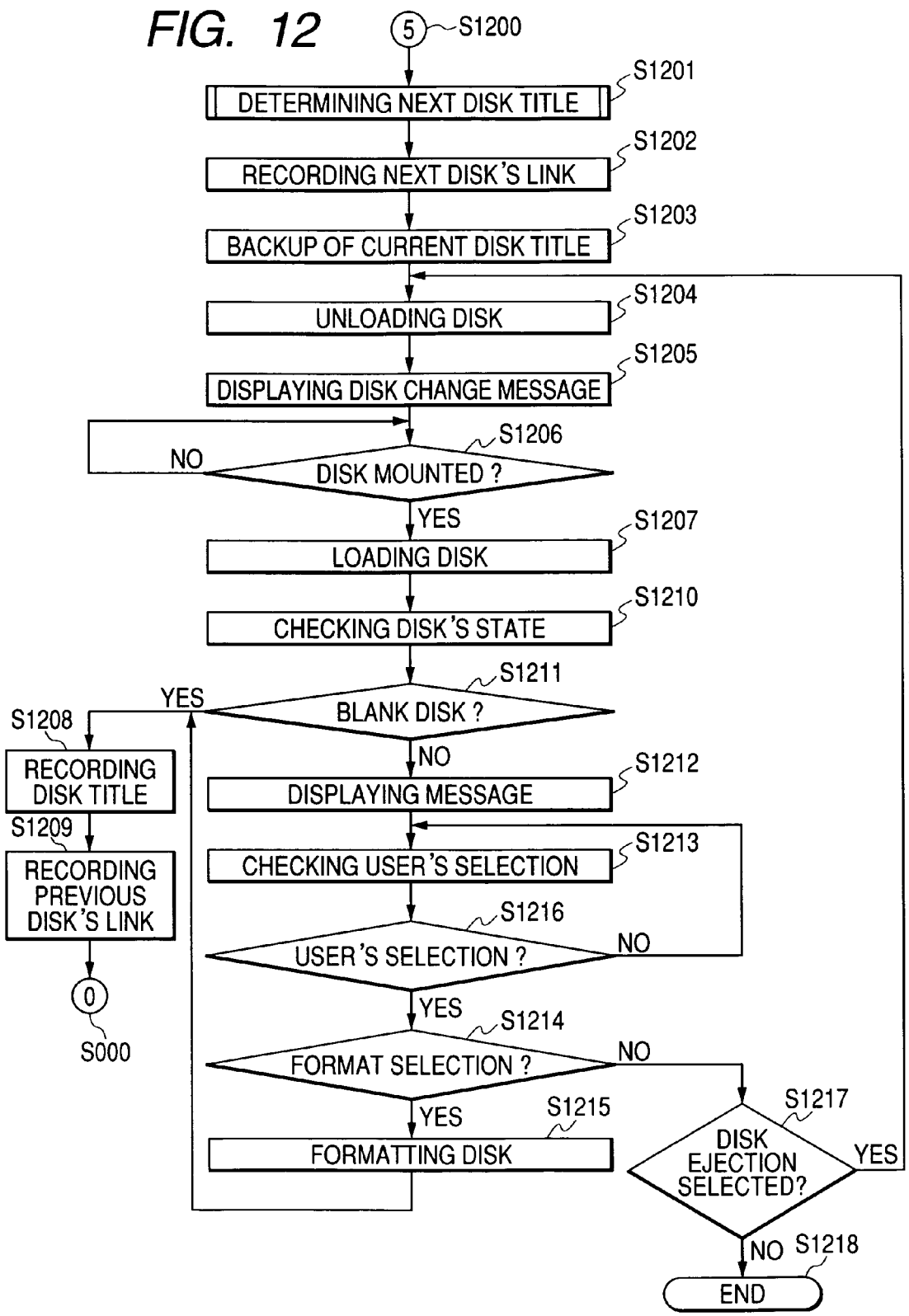
FIG. 12 is a flowchart showing an operation at the time of disk change.

FIG. 12 shows a flowchart explaining an operation of the control microcomputer 1*a* at the time of link formation and recording.

First, the control microcomputer 1*a* determines a disk title of the next step according to the processing that is explained with reference to the flow of FIG. 6 in the first embodiment (step S1201). Next, the control microcomputer 1a records the determined disk title of the next disk in link destination disk title areas (1004, 1014, and 1024 in FIG. 10) (step S1202). In addition, the control microcomputer 1a backs up the disk title of the disk, which is currently inserted, and the disk title of the next disk into the RAM area of the control microcomputer 1a (step S1203).

When the backup of the titles ends, the control microcomputer 1a unloads the disk with the loading roller (step S1204) and displays the message 209 in FIG. 8 on the display portion 4 (step S1205). Here, the control microcomputer 1a waits for input until the user inserts the next disk (step S1206).

When the user inserts a new disk, the control microcomputer 1a detects the insertion of the disk and loads the new disk (step S1207).

When the loading is completed, the control microcomputer 1a checks whether the disk inserted anew is a blank disk (step S1210). If the disk is a blank disk, the control microcomputer 1a extracts the disk title determined in step S1201 and the disk title of the disk inserted previously, which is stored before the unload, from the RAM area, records the disk titles in a predetermined area of the new disk (steps S1208 and S1209), and then returns to the recording standby state (step S000) in FIG. 2.

Figure 13:
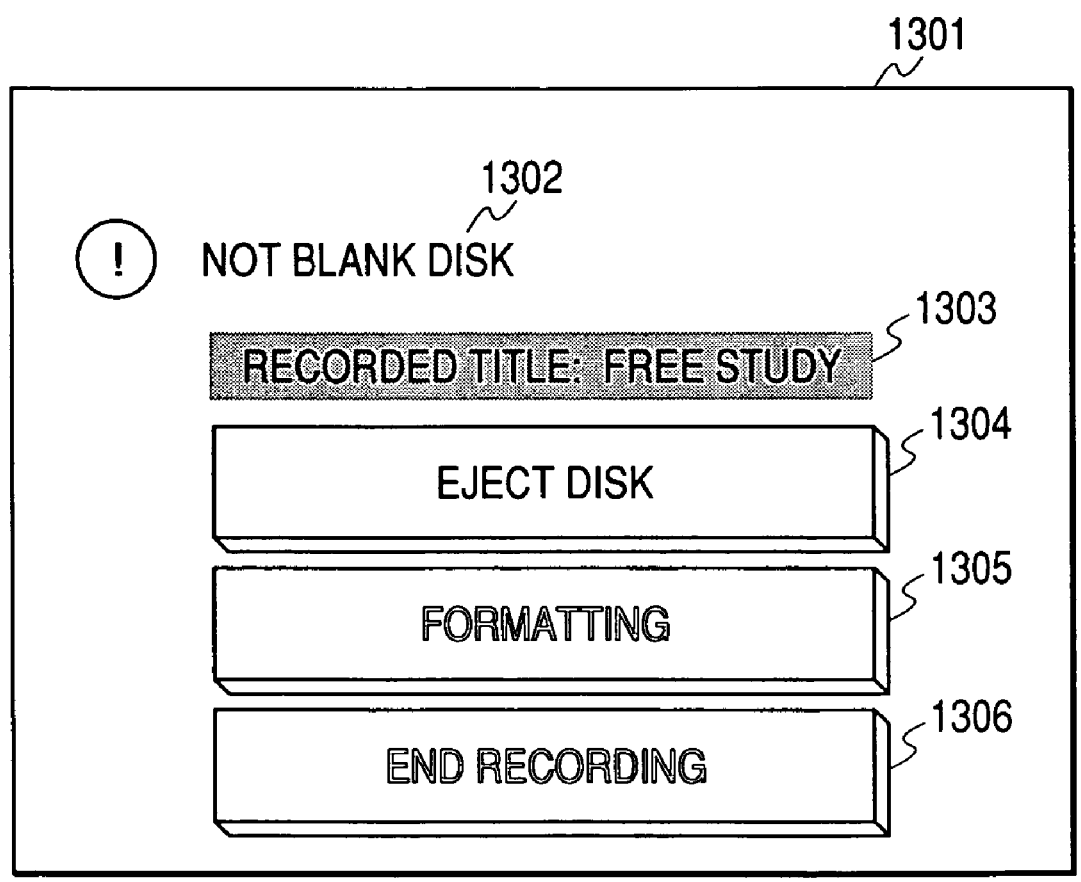
FIG. 13 is a diagram showing an example of a message to be displayed at the time of photographing.

On the other hand, if the disk inserted anew is not a blank disk in step S1211, the control microcomputer 1a displays a message screen 1301 shown in FIG. 13 on the display portion 4 (step S1212) and waits for selection by the user (steps S1213 and S1216). At this point, the control microcomputer 1a displays "recorded title: free study (1303)," "eject disk (1304)," "formatting (1305)," and "end recording (1306)."

If the user selects a format (step S1214), the control microcomputer 1a performs formatting of the disk (step S1215) and shifts to step S1208. If the disk ejection is selected (step S1217), the control microcomputer 1a shifts to step S1204. If the recording end is selected, the control microcomputer 1a ends the recording in step S1216.

Note that, although not explained in the flowcharts explained above, when a disk is changed, it is also possible to copy information such as a category into a category of the next disk.

In addition, when discontinuous recording is performed or when a user wishes to cut off continuity of recording intentionally, it is also possible to provide recording control means, which is arranged inhibit an operation for recording identification information, so that link photographing is not performed. Consequently, since operation for cancellation may not be performed every time, operability is improved.

In this way, in this embodiment, in addition to the automatic formation of a title according to the first embodiment, a title of a disk before change is recorded in a disk after change and a title of the disk after change is recorded in the disk before change. Thus, when image data is continuously recorded while a disk is changed, it is possible to recognize easily a relation of the disks before and after change.

Next, a third embodiment of the present invention will be explained.

Figure 14:
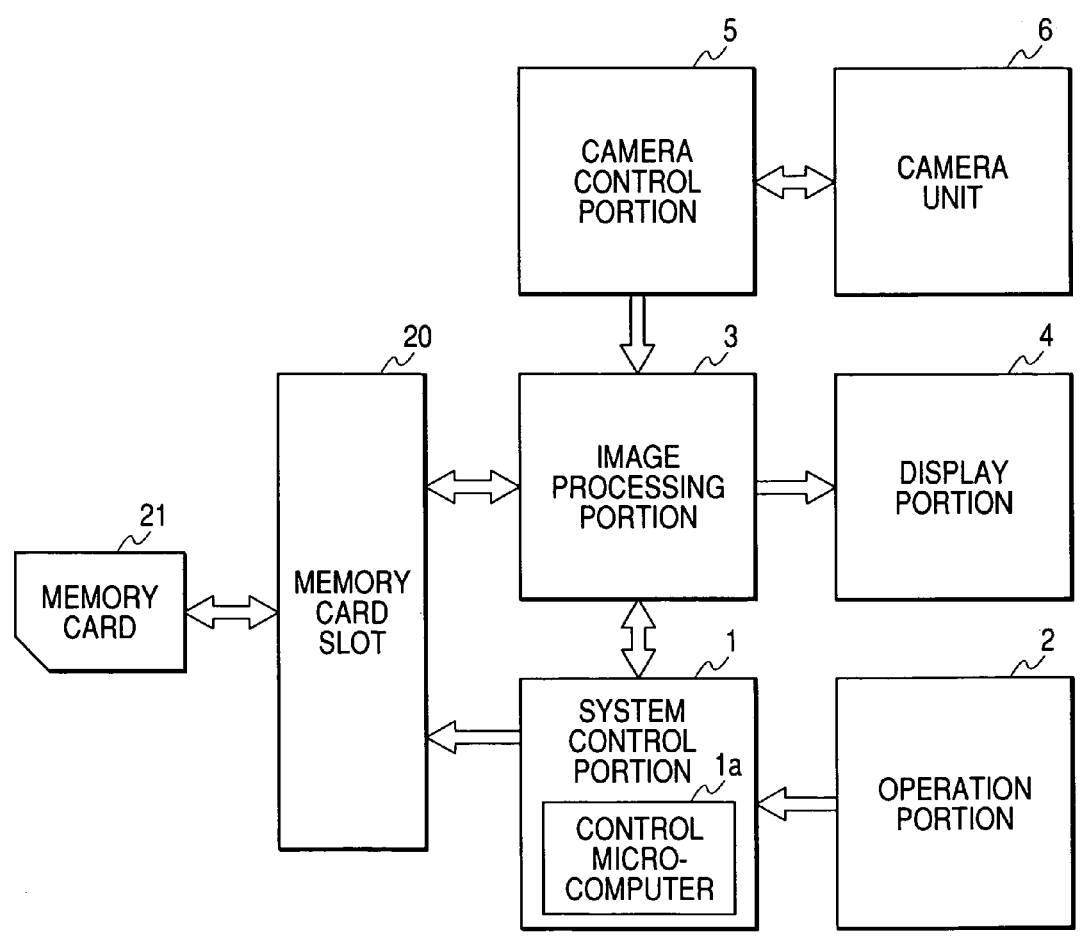
FIG. 14 is a block diagram showing an example of another structure of a video camera as an embodiment of the present invention.

FIG. 14 is a block diagram showing a structure of a video camera as the third embodiment. Although an optical disk is used as a recording medium in the first and the second embodiments, a memory card is used as a recording medium in this embodiment. In FIG. 14, the structure other than a memory card slot 20 and a memory card 21 is basically the same as the structure in FIG. 1, so that a detailed explanation of the structure will be omitted.

In FIG. 14, the memory card 21 is mounted on the video camera via the memory card slot 20, and the image processing portion 3 applies reading and writing of image data to the memory card 21 via the memory card slot 20. In addition, the system control portion 1 can detect a state or the like of the memory card 21 via the memory card slot 20.

Next, processing at the time of photographing in this embodiment will be explained with reference to FIGS. 15, 16, 17A through 17C, and 18.

Figure 15:
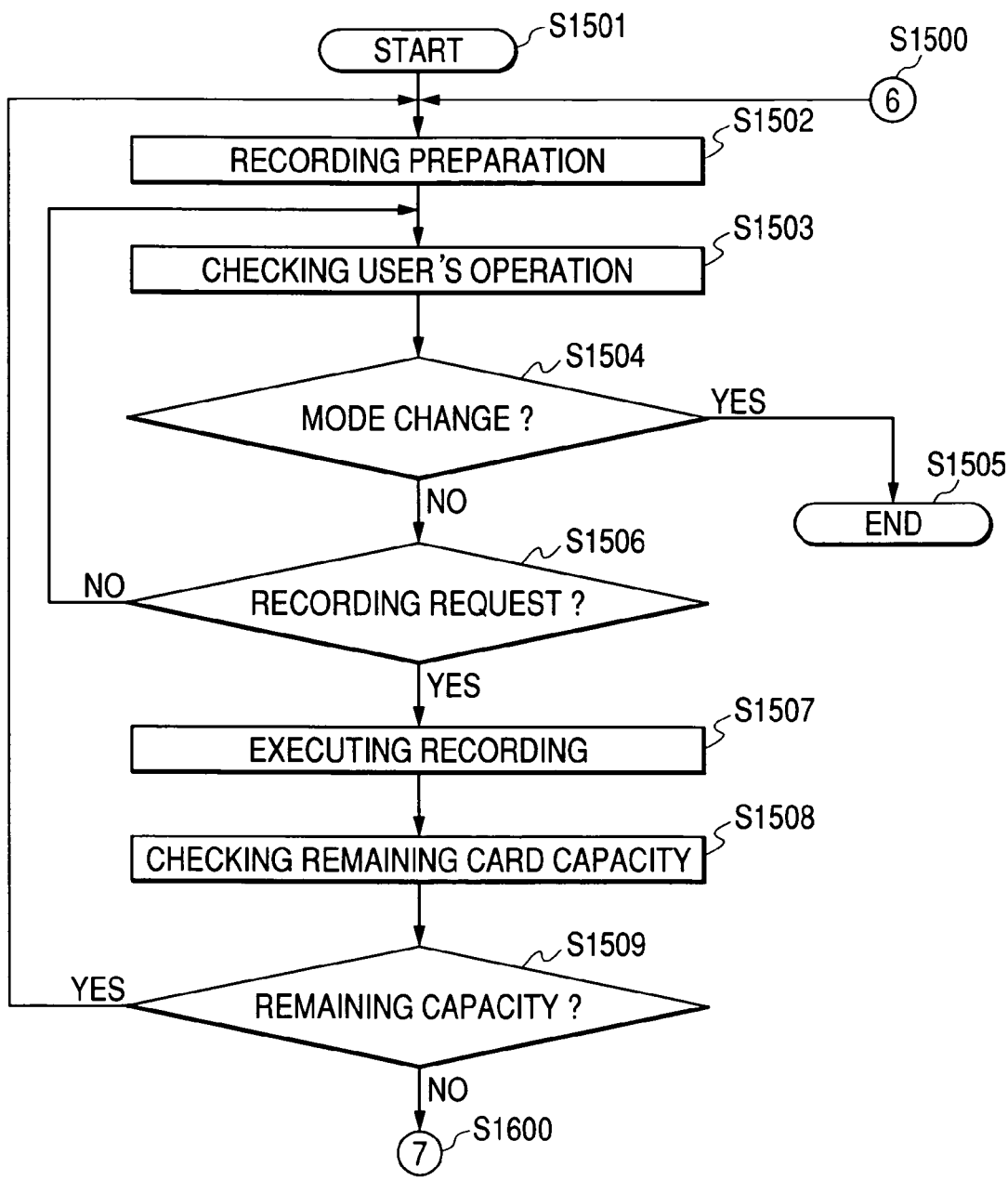
FIG. 15 is a flowchart showing a recording operation in a third embodiment.
Figure 17A:
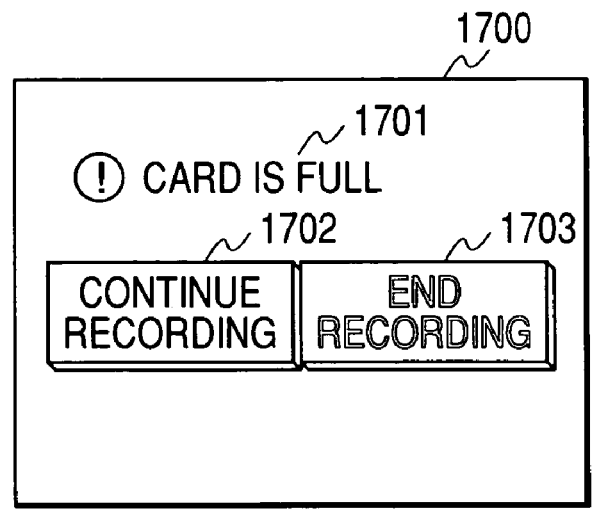
FIGS. 17A, 17B, and 17C are diagrams showing examples of messages to be displayed at the time of photographing.
Figure 17B:
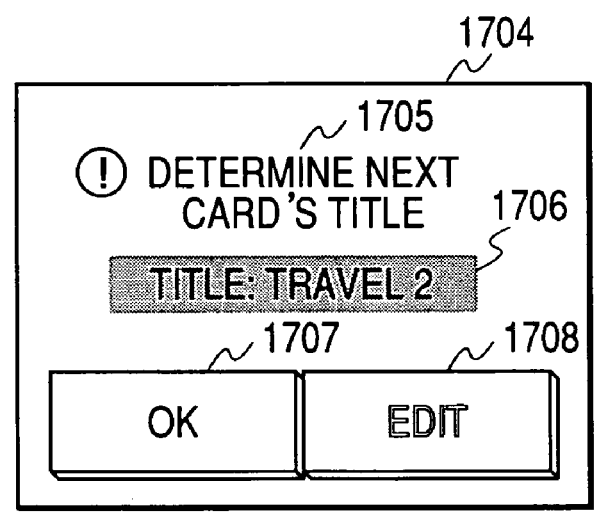
Figure 17C:
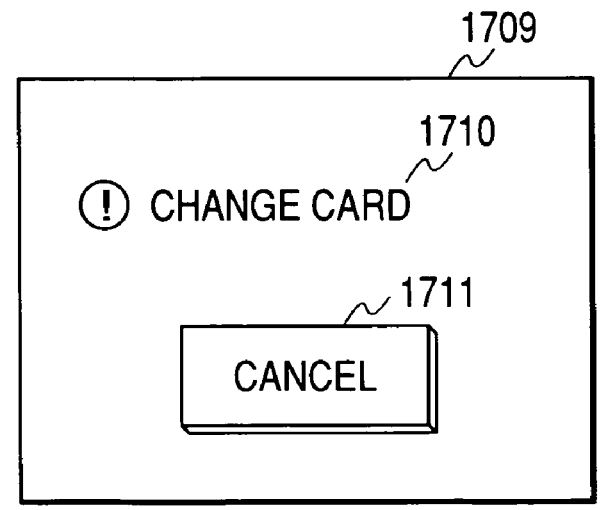

FIGS. 15 and 16 are flowcharts showing an operation of the control microcomputer 1a at the time of photographing.

In FIG. 15, when a user operates a not-shown mode switch provided in the operation portion 2 to switch a mode to a photographing mode, the control microcomputer 1a shifts from a recording standby state (step S1500) to a start state (step S1501) and, subsequently, shifts to recording preparation processing (step S1502) by, for example, reading out management information from the memory card 21.

Subsequently, the control microcomputer 1a comes into a state of waiting for a recording request from the user or mode change (steps S1503, S1504, and S1506). Then, when the user depresses a recording switch, the control microcomputer 1a judges that there is a recording request from the user and records photographed image data in the memory card 21 (step S1507). Note that the video camera of this embodiment photographs a still image of one frame according to recording switch operation performed once and records the still image in the memory card 21.

After ending the recording of one still image in this way, the control microcomputer 1a checks a remaining capacity of the memory card 21 (steps S1508 and S1509). If the remaining capacity is less than a predetermined amount, the control microcomputer 1a proceeds to link formation processing (step S1600). If the remaining capacity of the memory card 21 is more than the predetermined amount, the control microcomputer 1a returns to step S1602 and repeats the operation described above.

The operation of the control microcomputer 1a in the link formation processing S1600 is the same as the operation procedure explained in the flowchart of FIG. 12. When the remaining capacity of the memory card 21 runs out during recording and link formation setting is effective, the control microcomputer 1a displays a message screen 1700 in FIG. 17A on the display portion 4.

Next, the control microcomputer 1a is in an input waiting state until the user selects "continue recording (1702)" or "end recording (1703)."

Then, for example, when the user selects "continue recording (1702)," the control microcomputer 1a shifts to the link formation processing (step S1600 in FIG. 16). On the other hand, if the user selects "end recording (1703)," the control microcomputer 1a ends the recording. In addition, when the link formation is ineffective, the control-microcomputer 1a also ends the recording.

FIG. 16 shows a flowchart explaining an operation of the control microcomputer 1a at the time of link formation and recording.

First, the control microcomputer 1a determines a disk title of the next disk according to the processing explained with reference to the flow of FIG. 6 in the first embodiment (step S1601). Next, the control microcomputer 1a records the determined card title of the next card in the link destination card title areas (1004, 1014, and 1024 in FIG. 10).

Next, the control microcomputer 1a backs up a card title of a card, which is currently inserted, and the card title of the next card into the RAM area of the control microcomputer 1a (step S1603). When the backup of the titles ends, the control microcomputer 1*a* displays "change card (1710)" and "cancel (1711)" in a message screen 1709 shown in FIG. 17C on the display portion 4 (step S1605). Here, the control microcomputer 1*a* waits for input until the user changes the next memory card (step S1606).

When the control microcomputer 1*a* detects change of a memory card, the control microcomputer 1*a* checks whether a new memory card is a blank card (step S1610). If the new memory card is a blank card as a result of the check (step S1611), the control microcomputer 1*a* extracts the memory card title determined in step S1601 and the memory card title of the memory card inserted previously, which is stored before change of the card, from the RAM area and records the memory card titles in a predetermined area of the new memory card (steps S1608 and S1609). After that, the control microcomputer 1*a* shifts to the recording standby state at the time of start of photographing (step S1500) again.

Figure 18:
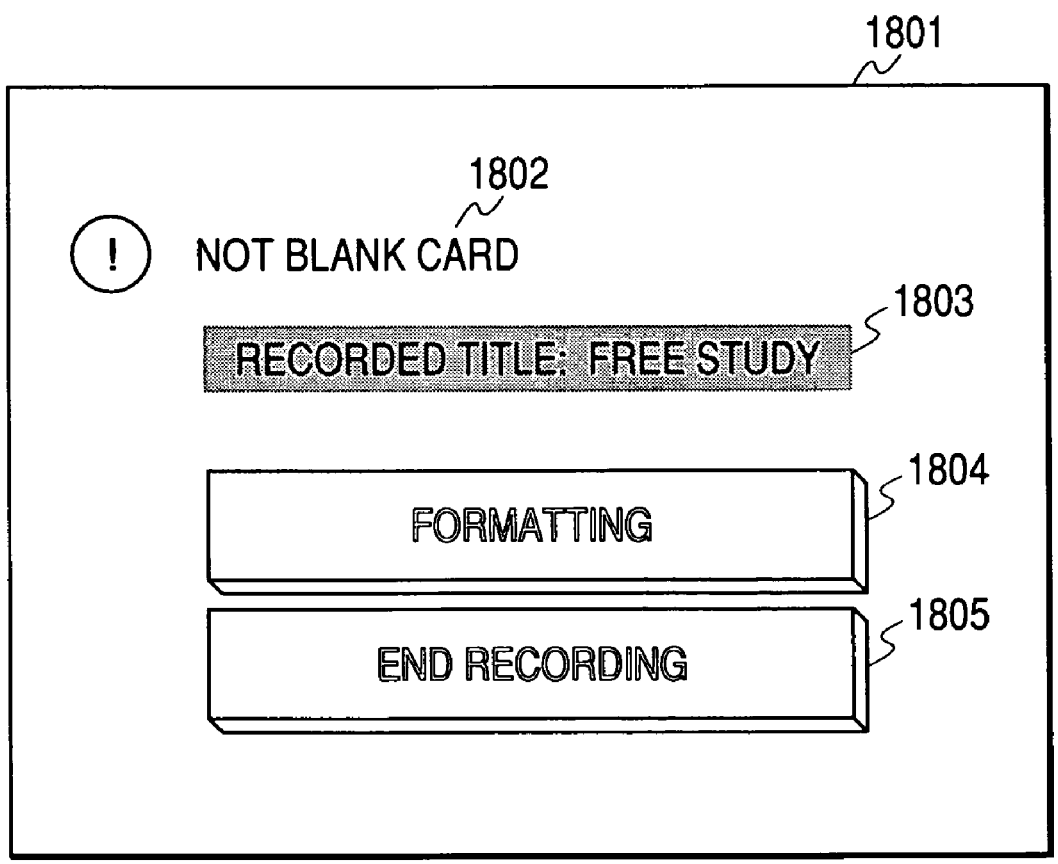
FIG. 18 is a diagram showing an example of a message to be displayed at the time of photographing.

On the other hand, if the memory card inserted anew is not a blank card in step S1611, the control microcomputer 1*a* displays a message screen 1801 shown in FIG. 18 on the display portion 4 (step S1612) and waits for selection by the user (steps S1613, S1617, and S1616).

Then, when the user selects "formatting (1804)" in FIG. 18, the control microcomputer 1*a* performs formatting (step S1815) and, then, shifts to step S1608. In addition, when ejection of the memory card is detected in step S1607, the control microcomputer 1*a* shifts to step S1605. If the user selects "end recording (1805)," the control microcomputer 1*a* ends the recording.

When the user selects "end recording (1805)" in FIG. 18 in step S1614, the control microcomputer 1*a* shifts to step S1618 and ends the processing. Note that, although not explained in the flowchart, when a memory card is changed, it is also possible to copy information such as a category into a category of the next memory card.

Note that, in the first to third embodiments, when a disk or a memory card is changed, a title after change is determined on the basis of a title of a disk or a memory card before change.

In addition to the embodiments described above, the present invention can also be applied to, for example, a case where a video camera includes two recording and reproducing portions, which apply recording and reproduction of image data to plural disks or memory cards, respectively, and on the basis of a title of a recording medium having image data recorded therein, the camera generates a title of the other recording medium using one of the recording and reproducing portions. The present invention has the same effects in this case.

In the second and third embodiments, a title of a recording medium after change is formed when a remaining recording capacity runs short and a user selects continuation of recording. However, the present invention is not limited to this, and for example, it is also possible to generate a title of a recording medium to be mounted next when a recording medium is mounted anew or generate a title of the next recording medium at timing until a remaining recording capacity runs short.

The present invention also includes processing implemented by: supplying a program code of software for realizing the functions of the embodiments described above to a computer in an apparatus or a system connected to various devices to actuate the various devices in order to realize the functions of the embodiments; and actuating the various devices in accordance with a program stored in the computer (a CPU or an MPU) of the system or the apparatus.

In this case, the program code itself of the software realizes the functions of the embodiments, and the program code itself and means for supplying the program to the computer, for example, a recording medium having such a program code stored therein constitute the present invention. Examples of an available recording medium recording such a program include a flexible disk, a hard disk, an optical disk, a magneto-optical disk, a CD-ROM, a magnetic tape, a nonvolatile memory card, and a ROM.

In addition, such a program code is also included in the embodiments of the present invention not only in the case where the computer executes the supplied program codes to realize the functions of the embodiments but also in the case where the program code cooperates with an operating system (OS), other application software, or the like running on the computer to realize the functions of the embodiments.

Moreover, the present invention also includes a case where, after the supplied program code is stored in a memory provided in a function extended board of the computer and a function extended unit connected to the computer, a CPU or the like provided in the function extended board or the function extended unit performs actual processing partially or entirely on the basis of an instruction of the program code, and the functions of the embodiments are realized by the processing.

Many widely different embodiments of the present invention may be constructed without departing from the scope of the present invention. It should be understood that the present invention is not limited to the specific embodiments described in the specification, except as defined in the appended claims.

This application claims priorities from Japanese Patent Applications No. 2003-435126 filed on Dec. 26, 2003 and No. 2004-053293 filed on Feb. 27, 2004, which are hereby incorporated by reference herein.

What is claimed is:

1. A recording apparatus, comprising: a recording unit that records data on a mounted recording medium; a detecting unit that detects first identification information for identifying a mounted first recording medium; a generating unit that generates second identification information for identifying a second recording medium, based on the first identification information detected by the detecting unit, when the second recording medium is mounted instead of the first recording medium; a selecting unit that, when third identification information different from the second identification information is already recorded on the second recording medium, judges whether the second identification information should be recorded on the second recording medium instead of the third identification information; and a control unit that controls whether the second identification information is to be recorded on the second recording medium according to a result of a selection by the selecting unit, wherein the recording unit records the second identification information generated by the generating unit on the second recording medium.

2. The recording apparatus according to claim 1, wherein the generating unit generates the second identification information when recording of identification information is not inhibited.

3. The recording apparatus according to claim 1, further comprising:
an instructing unit that, when a remaining recording capacity of the first recording medium decreases to be less than a predetermined amount during recording of the data on the first recording medium, instructs whether the data should be continuously recorded on the second recording medium, wherein the generating unit generates the second identification information when recording of the data on the second recording medium is instructed by the instructing unit.

4. The recording apparatus according to claim 1, wherein the first identification information includes information indicating a title of the first recording medium, and the second identification information includes information indicating a title of the second recording medium.

5. The recording apparatus according to claim 4, wherein the generating unit generates the second identification information so as to include therein a part of the title of the first recording medium.

6. The recording apparatus according to claim 5, wherein the generating unit generates the second identification information by combining a part of the title of the first recording medium and a predetermined numerical value.

7. The recording apparatus according to claim 1, wherein the detecting unit detects the first identification information recorded on the first recording medium.

8. A recording apparatus, comprising: a recording unit that records data on a mounted recording medium; a detecting unit that detects first identification information for identifying a mounted first recording medium; a generating unit that generates second identification information for identifying a second recording medium that should be mounted instead of the first recording medium; a selecting unit that, when third identification information different from the second identification information is already recorded on the second recording medium, judges whether the second identification information should be recorded on the second recording medium instead of the third identification information; and a control unit that controls whether the second identification information is to be recorded on the second recording medium according to a result of a selection by the selecting unit, wherein the generating unit generates the second identification information based on the first identification information detected by the detecting unit, and wherein the recording unit records the second identification information generated by the generating unit on the first recording medium and records the first identification information and the second identification information on the second recording medium, when the second recording medium is mounted instead of the first recording medium.

9. The recording apparatus according to claim 8, wherein the generating unit includes a memory for storing the first identification information detected by the detecting unit and records the first identification information, which is stored in the memory, on the second recording medium when the second recording medium is mounted.

10. The recording apparatus according to claim 9, wherein the generating unit generates the second identification information when recording of identification information is not inhibited.

11. The recording apparatus according to claim 9, further comprising:
an instructing unit that, when a remaining recording capacity of the first recording medium decreases to be less than a predetermined amount during recording of the data on the first recording medium, instructs whether the data should be continuously recorded on the second recording medium,
wherein the generating unit generates the second identification information when recording of the data on the second recording medium is instructed by the instructing unit.

12. The recording apparatus according to claim 9, wherein the first identification information includes information indicating a title of the first recording medium, and the second identification information includes information indicating a title of the second recording medium.

13. The recording apparatus according to claim 12, wherein the generating unit generates the second identification information so as to include therein a part of the title of the first recording medium.

14. The recording apparatus according to claim 13, wherein the generating unit generates the second identification information by combining a part of the title of the first recording medium and a predetermined numerical value.

15. The recording apparatus according to claim 9, wherein the detecting unit detects the first identification information recorded on the first recording medium.

16. A recording apparatus configured for mounting a recording medium thereon, comprising: a generating unit that generates first identification information for identifying a second recording medium to be mounted on the recording apparatus instead of a first recording medium, during mounting of the first recording medium on the recording apparatus; a recording unit that records the first identification information generated by the generating unit on the first recording medium during the mounting of the first recording medium on the recording apparatus, a selecting unit that, when second identification information different from the first identification information is already recorded on the second recording medium, judges whether the first identification information should be recorded on the second recording medium instead of the second identification information; and a control unit that controls whether the first identification information is to be recorded on the second recording medium according to a result of a selection by the selecting unit.

17. The recording apparatus according to claim 16, wherein the generating unit generates the first identification information based on second identification identifying the first recording medium, such that the generated first identification information is related to the second identification information.

18. The recording apparatus according to claim 16, further comprising an extraction unit that extracts second identification information identifying the first recording medium from the first recording medium mounted on the recording apparatus, wherein the recording unit records the second identification information extracted by the extraction unit onto the second recording medium in response to mounting of the second recording medium on the recording apparatus.

19. A method of controlling a recording apparatus configured for mounting a recording medium thereon and including a central processing unit and a recording unit that records data on a mounted recording medium, the method comprising steps of: generating first identification information of a second recording medium to be mounted on the recording apparatus instead of a first recording medium, during mounting of the first recording medium on the recording apparatus; recording the generated first identification information on the first recording medium with the recording unit during the mounting of the first recording medium on the recording apparatus, when second identification information different from the first identification information is already recorded on the second recording medium, judging whether the first identification information should be recorded on the second recording medium instead of the second identification information; and controlling whether the first identification information is to be recorded on the second recording medium according to a result of a selection in the judging step, wherein at least one of the generating step and the recording step is performed, at least in part, by the central processing unit.

20. A recording apparatus, comprising:
- a recording unit that records data on a mounted recording medium;
- a detecting unit that detects first identification information for identifying a mounted first recording medium;
- a generating unit that generates second identification information for identifying a second recording medium, based on the first identification information detected by the detecting unit, when the second recording medium is mounted instead of the first recording medium; and
- a control unit that judges whether third identification information different from the second identification information is already recorded on the second recording medium, and judges whether the second identification information should be recorded on the second recording medium according to a judgment result,
- wherein the recording unit records the second identification information generated by the generating unit on the second recording medium.

21. The recording apparatus according to claim 20, wherein the first identification information includes information indicating a title of the first recording medium, and the second identification information includes information indicating a title of the second recording medium.

22. The recording apparatus according to claim 21, wherein the generating unit generates the second identification information so as to include therein a part of the title of the first recording medium.

23. The recording apparatus according to claim 22, wherein the generating unit generates the second identification information by combining a part of the title of the first recording medium and a predetermined numerical value.

24. A recording apparatus, comprising:
- a recording unit that records data on a mounted recording medium;
- a detecting unit that detects first identification information for identifying a mounted first recording medium;
- a generating unit that generates second identification information for identifying a second recording medium that should be mounted instead of the first recording medium; and
- a control unit that judges whether third identification information different from the second identification information is already recorded on the second recording medium and judges whether the second identification information should be recorded on the second recording medium according to a judgment result,
- wherein the generating unit generates the second identification information based on the first identification information detected by the detecting unit, and
- wherein the recording unit records the second identification information generated by the generating unit on the first recording medium and records the first identification information and the second identification information on the second recording medium, when the second recording medium is mounted instead of the first recording medium.

25. The recording apparatus according to claim 24, wherein the first identification information includes information indicating a title of the first recording medium, and the second identification information includes information indicating a title of the second recording medium.

26. The recording apparatus according to claim 25, wherein the generating unit generates the second identification information so as to include therein a part of the title of the first recording medium.

27. The recording apparatus according to claim 26, wherein the generating unit generates the second identification information by combining a part of the title of the first recording medium and a predetermined numerical value.

* * * * *